June 10, 1952 H. HERSCH 2,599,915
FUEL DISTRIBUTION SYSTEM
Filed July 23, 1947 2 SHEETS—SHEET 1

INVENTOR.
Herman Hersch
BY
Hoodling and Krost
attys

June 10, 1952 — H. HERSCH — 2,599,915
FUEL DISTRIBUTION SYSTEM
Filed July 23, 1947 — 2 SHEETS—SHEET 2

INVENTOR.
Herman Hersch
BY Stroodling and Krost
attys.

Patented June 10, 1952

2,599,915

UNITED STATES PATENT OFFICE 2,599,915

FUEL DISTRIBUTION SYSTEM

Herman Hersch, Cleveland Heights, Ohio, assignor of one-half to Selma Hersch

Application July 23, 1947, Serial No. 763,013

8 Claims. (Cl. 123—119)

My invention relates to internal combustion carburetion in general, and to fuel distribution systems in particular. From the beginning of the development of the internal combustion engine the problem of fuel distribution has received the constant attention of carburetion engineers and automotive designers. Injection carburetion was attempted in the early engine designs, but was soon abandoned because the systems advocated depended upon fuel pumps and complicated timing for the distribution system.

The present well-known carburetor system therefore became widely accepted because of its relative simplicity. However, this system depends upon air suspension of the fuel at a common air intake port, and the subsequent distribution of the fuel-air mixture to the various intake ports by means of branch ducts. The disadvantages of fuel precipitation; highly heated air causing reduced volumetric efficiency; and an uneven distribution to the various cylinders; are well-known.

In recent years there has been renewed activity in the field of direct fuel injection to the valve intake ports. These recent developments are a marked improvement over the older injection systems, but have all failed to produce the results which are theoretically possible with direct fuel injection. These short comings are well-known and therefore need not be set out further in this discussion.

Therefore, an object of my invention is to dispense liquid fuel directly at the intake zone of an internal combustion engine.

Another object of my invention is to employ the movement of air into the cylinder to automatically time the direct dispensing of liquid fuel into an internal combustion engine.

Still another object of my invention is to increase the volumetric efficiency of an internal combustion engine.

Another object of my invention is to increase the compression in an internal combustion engine.

Still another object of my invention is to provide a fuel distribution system capable of using low grade fuels which are not easily suspended in air.

Yet another object of my invention is to equally distribute fuel to the several cylinders of a multiple cylinder internal combustion engine.

And another object of my invention to simplify the construction of a fuel distribution system.

Other objects and fuller understanding of my invention may be had by referring to the following description and claims, taken in conjunction with the accompanying drawing, in which:

Figures 1, 5:
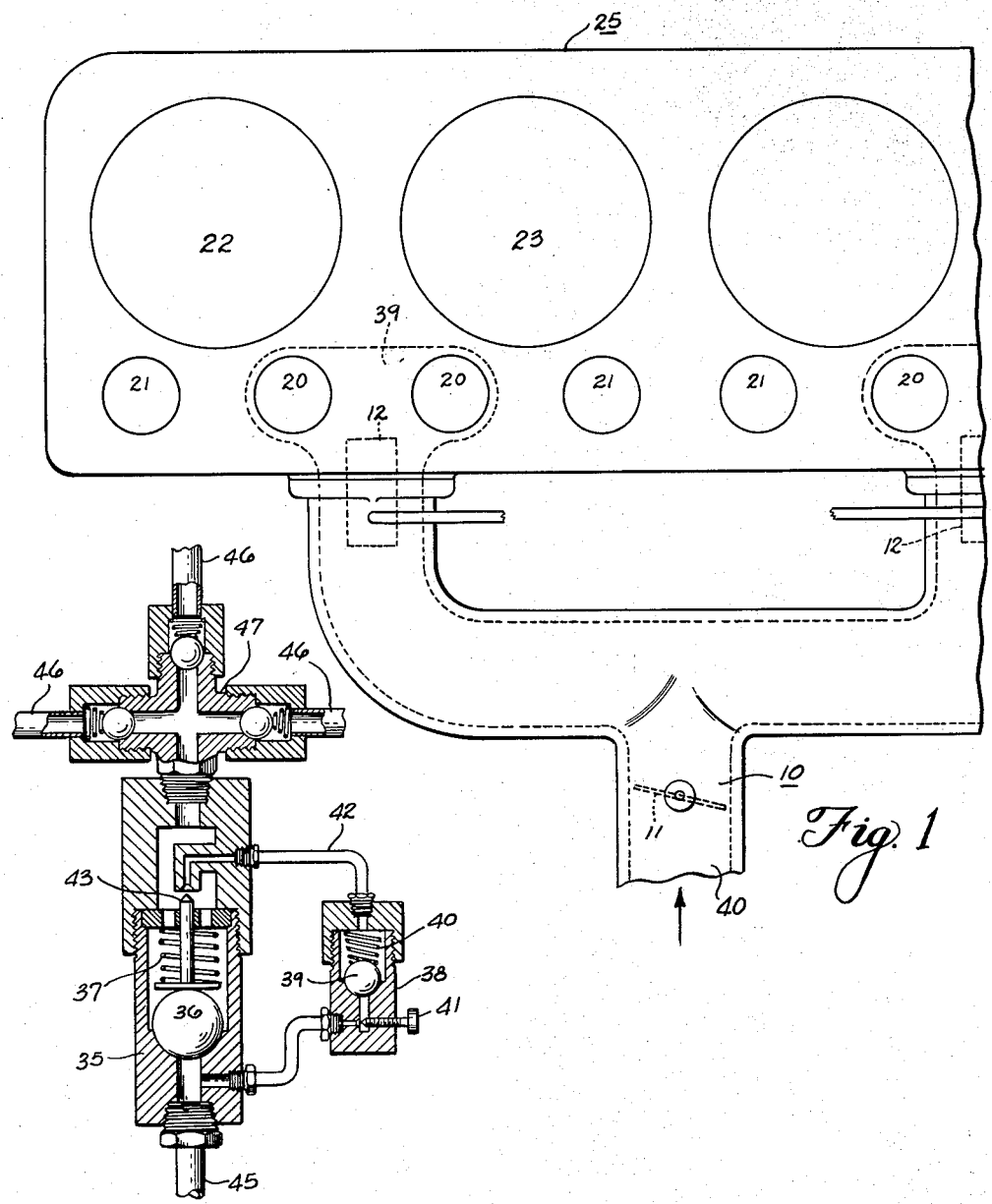
Figure 1 is a broken away plan view of a cylinder block of multiple cylinder internal combustion engine illustrating the relative position of my improved distribution system with the intake ports of the cylinders.
Figure 5 is a ball-check type of valve and idle system which may be employed as a fuel valve in my system.

With reference to the Figure 1 of the drawings, I illustrate a portion of a cylinder block 25 having a plurality of cylinders. In this Figure 1, the operation of only two cylinders 22 and 23 is considered, because they are sufficient to set forth the principle of my invention. The cylinder block 25 may have any number of cylinders. However, in the usual motor design, adjacent cylinders, for example the cylinders 22 and 23, will have their intake port in a common intake chamber 39. Therefore, the intake valves 20 are positioned adjacent one another, whereas exhaust valves 21 are placed at the extreme position. In conventional design, the exhaust valves 21 are placed at the extreme positions in order to disperse the heat from the exhaust more evenly, and prevent concentrating heat from two exhaust valves. In my improved fuel distribution system, I have taken advantage of the location of the two intake valves 20 within one intake chamber 39 in order to reduce the number of parts required to distribute the fuel. However, the location of the intake and exhaust ports in the standard type of internal combustion engine in no way affects the principle of my invention, and my invention may be applied to single cylinder engines, and may be applied to any design of engine whether the intake valves 20 are so located as to take advantage of the adjacent location or not.

In the Figure 1, I have illustrated a portion of an intake manifold 10. In my fuel distribution system, the manifold 10 is in fact only an air duct, and is built substantially like the conventional intake manifold only for the purpose of having a common air entry 40 through which the flow of air may be controlled by a butterfly valve 11. Actually, each intake chamber could readily be served by a short length of conduit extending out from the air intake chamber only far enough to support a suitable butterfly valve like the butterfly valve 11. The manifold 10 is not required to conduct a mixed charge of air and gasoline from a common carburetor source.

Figure 2:
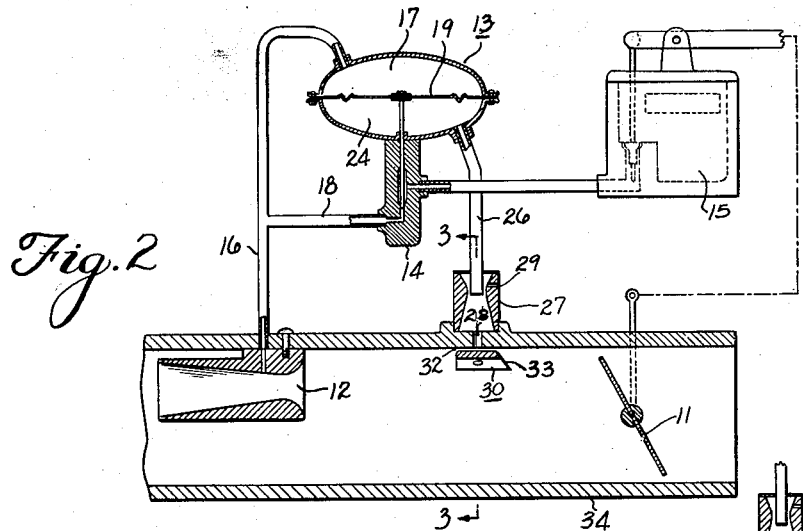
Figure 2 is a diagrammatic illustration setting forth one embodiment of my improved fuel distribution system, and employing a diaphragm actuated valve.

In the Figure 2 of the drawing, I set forth the basic principle of operation for my improved system, and in that figure the manifold is represented by a straight length of conduit 34. In the Figure 2 it will be seen that the butterfly valve 11 is positioned near an entry end of the conduit 34 and the other end of the conduit 34 goes directly to the intake port of the cylinders. In a six-cylinder engine, for example, three devices as illustrated in the Figure 1 could be used to operate the engine. However, if an air cleaner is to be employed, three cleaners would be required if straight lengths of conduit were to be used in place of the unitary manifold 10 illustrated in the Figure 1. Furthermore, three synchronized valves 11 would be required in the use of a straight conduit as pictured in the Figure 2, in place of the one as illustrated in the Figure 1. These are matters of design, and in no way pertain to the principle of operation of my invention.

As indicated, the Figure 2 is provided to set forth one example employing the principle of my invention. In the Figure 2, I illustrate the venturi 12, a diaphragm device 13, a valve 14, and a fuel metering system 15. A conduit 16 extends from the throat of the venturi 12 to the upper chamber 17 of the diaphragm device 13. A branch arm 18 leads from the conduit 16 to the valve 14. The butterfly valve 11 is mechanically interconnected with the metering device 15, and both members are attached to a manually controlled accelerator in order that the quantity of air and the quantity of liquid fuel may be proportionately increased and decreased to control the speed of the internal combustion engine.

As illustrated in the Figure 1 of the drawing, I locate the venturi 12 as close to the intake port of the internal combustion engine as is practical for operation under natural physical conditions. Therefore, when the pistons of the engine draw a charge of air, and only when the pistons draw a charge of air, the air will rush rapidly through the venturi 12, as well as around the venturi within the manifold 10. This simple yet fundamental fact is the key to the success of my distribution system. In the Figure 2, the intake valves and pistons are not illustrated, but it is understood that the venturi 12 is to be placed as close to the intake ports as practical.

Also, I have placed the venturi to take advantage of the most direct movement of air to the cylinders. In an engine having an intake port below the valves, this position is at the top of the conduit conducting the air. Air, like electricity, tends to follow the path of least resistance. In an overhead valve system, therefore, the venturi would be placed at the bottom of the conduit. Furthermore, the butterfly valve tends to direct the air along one side of the conduit, and therefore by positioning my venturi along one side and posterior to the butterfly valve, the venturi will be active even during cranking intake of the motor. I have found that this position for the venturi will produce a substantial degree of vacuum at the throat of the venturi as compared to the manifold pressure, during normal cranking intake.

Those familiar with the carburetor art will understand that when air is passed rapidly through the venturi 12, a low pressure area will be produced in the throat thereof substantially at the point where the conduit 16 enters the venturi in the Figure 2. When air is drawn into a cylinder, air will pass through the venturi 12 as well as around the venturi 12. However, the movement of air through the conduit 34 into a particular intake port is not constant, but will only be in motion during the intake period of the work cycle. Therefore, the low pressure area at the throat of the venturi 12 will exist only during the periods in which the cylinders served are drawing a charge stroke. However, in the manifold type conduit 10 illustrated in the Figure 1, air will be drawn into the entrance port of the manifold 10 almost continuously, because air will be drawn by at least one of the multiple cylinders of the engine block at all times. Thereafter, the air drawn through the entrance port past the butterfly valve will be directed in one of the several branch arms of the manifold 10. Therefore, considering each branch arm individually, the movement of air in a particular branch arm will be substantially as described in connection with the conduit 34 of Figure 2. That is, in Figure 1 the branch arm of the manifold 10 serving the cylinders 22 and 23 will have a movement of air therethrough only when the cylinder 22 or the cylinder 23 is drawing a charge stroke. At other times the movement of air in the branch arm serving the cylinders 22 and 23 will be nil. Consequently, the low pressure area at the throat of the venturi 12 in the branch arm of the manifold 10 serving the cylinders 22 and 23 will be in evidence only during the period when either the cylinder 22 or 23 is drawing a charge of air. Of course, in the conventional firing arrangement of an internal combustion engine, the cylinders 22 and 23 will never be drawing a charge of air at the same time. Therefore, the one branch arm is able to serve both of the cylinders 22 and 23.

When the low pressure area is produced in the venturi 12 as a charge of air is drawn into a cylinder, a low pressure area will be produced in the conduit 16 and the branch arm 18. Consequently, the low pressure area will be produced in the top chamber portion 17 of the diaphragm device 13. Ordinarily, differential of pressure is produced between the throat of the venturi 12 and the conduit 34 to operate the diaphragm 19, and therefore it would be sufficient to connect the lower chamber 24 of the diaphragm device 13 to the conduit 34 posterior to the butterfly valve 11. It would then appear that a sufficient differential of pressure would be produced on the diaphragm 19 by the action of the venturi 12 on the upper chamber 17 to move the diaphragm 19 by such an arrangement. However, I have found that the differential of pressure between the throat of the venturi, and the conduit 34 proper, will vary considerably from low speed to high speed operation of the engine, and therefore I have provided additional means to close the valve rapidly in response to cessation of the intake charge into the cylinder. When the cylinder begins to draw a charge of air, the valve 14 should be opened immediately to allow gasoline to pass through the valve 14 and the branch arm 18 into the conduit 16 and into the throat of the venturi 12. The gasoline then will be impacted with a rapidly rushing stream of air and carried directly into the closely adjacent intake port. At the end of the intake stroke, however, the valve 14 should be closed immediately to stop the flow of gasoline. Otherwise, an excess of fuel would be carried into the venturi 12, and this excess of fuel would collect in the bottom of the conduit 34 as raw liquid fuel. This is the condition which exists in present type carburetion devices, and is to be avoided for good fuel distribution. In fact, much attention has been given to ways and means to recollect precipitated gasoline in the present air suspension carburetor devices. I have made the diaphragm device of my arrangement to take advantage of the change in air speed travel within the conduit 34. No raw fuel is ever deposited in the conduit 34. Only the amount of fuel actually required is drawn into the venturi.

I illustrate a conduit 26 leading from the lower chamber 24 of the diaphragm device 13 through a Venturi valve device 27. The Venturi valve device 27 is located in any convenient position relative to the conduit 34 between the intake port and the butterfly valve 11. A small opening 28 is provided through the wall of the conduit 34 to the interior of the device 27. It will be noted from the Figure 2 of the drawing, that the Venturi valve device 27 is formed with internal surfaces in the conventional Venturi design, and the end of the conduit 26 is positioned at the low pressure throat area of the Venturi device 27. A small opening 29 is provided to connect the interior of the device 27 with the atmosphere. The area of hole 29 is preferably larger than the annular area comprised of the difference in cross-sectional area of conduit 26 and throat of venturi 27.

Figure 3:
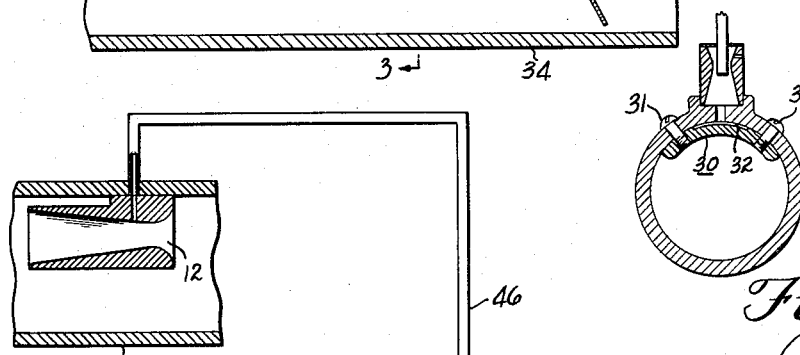
Figure 3 is a view through the line 3—3 of Figure 2.

An air tunnel is provided across the face of the opening 28 by means of a bridge 30. The bridge 30 is adapted to be secured to the internal surface of the conduit 34 by means of any suitable attachment device, for example the screws 31 illustrated in the Figure 3 of the drawing. The bridge member 30 has a clearance 32 through which air may pass from the front to the back thereof in relation to the flow of air in the conduit 34. The clearance 32 is only a few thousandths of an inch and the air trapped by the leading edge 33 of the bridge 30 will pass very rapidly through the clearance 32 past the face of the opening 28. Those familiar with the science of physics will understand that such a rush of air through the clearance 32 will pass by the opening 28 so rapidly that substantially none of the air will pass out through the opening 28 to the interior of the Venturi device 27 which is substantially at atmospheric pressure. On the other hand, even though the pressure within the conduit 34 will be somewhat lower than atmospheric pressure due to the rapid movement of air therethrough, the amount of air effectively passing through the small opening 29 through the Venturi valve device 27 and into the conduit 34 through the opening 28 will be negligible compared to the volume of air passing through conduit 34 during the intake stroke. The opening 9 will maintain the pressure in the tube 26 at substantially atmospheric pressure during the intake stroke, thus the pressure in the top chamber 17 will be less than the pressure in the bottom chamber 24. This causes diaphragm 19 to snap upwardly and open needle valve 14. However, at the end of the intake stroke the rush of air will cease, and there will be a short period of time required before the pressure within the conduit 34 can build up towards atmospheric pressure by air moving into the interior thereof to replace the air drawn into the cylinders during the charge stroke. During this period air will be able to rush through the opening 29 into the interior of the Venturi valve device 27 and through the opening 28 into the low pressure area within the conduit 34. Of course, such a rush of air at the throat of the Venturi valve device 27 past the end of the conduit 26 produces a low pressure area at the opening of the conduit 26. Consequently, a low pressure area will be produced in the lower chamber 24 of the diaphragm device 13.

At the end of the intake stroke, the low pressure area within the throat of the venturi 12 will be broken because of the sudden stoppage of air passing through the venturi 12, and therefore air will tend to rush through the conduit 16 to the upper chamber 17. The simultaneous increase of pressure within the chamber 17, and the decrease of pressure within the chamber 24, will cause the diaphragm 19 to snap downwardly and close the valve 14. Conversely, when a charge of air is being drawn rapidly through the conduit 34 the diaphragm 19 will be quickly pushed upwardly to open the valve 14 by the production of a low pressure in the upper chamber 17, and atmospheric pressure in the lower chamber 24 produced by air passing through the opening 29 and into the end of the conduit 26. As previously described, the passage of air through the clearance 32 will substantially block off the opening 28, but this will not prevent air passing through the opening 29 and up into the conduit 26.

The low pressure area at the throat of the venturi 12 in the embodiment illustrated in the Figure 2 of the drawings, serves a double purpose. The low pressure area not only serves to operate the diaphragm 19 as described, but produces a high vacuum on the branch arm 18 and consequently will tend to draw gasoline through the valve 14 from the metering device 15. That is, the conduits 16 and 18 are interconnected and enter the throat of the venturi 12. A low pressure in the throat of the venturi, therefore, results in a corresponding low pressure in conduits 16 and 18, and also in the chamber 17. Therefore, this low pressure produced in the throat of venturi reduces the pressure in chamber 17 and operates the diaphragm 19 and the needle valve. Operation of the needle valve will open a passageway to interconnect conduit 18 and metering device 15. The pressure, as stated, in conduit 18 is low when conduit 16 is low. The pressure on metering device 15 is atmospheric, or high. Therefore, a pressure differential is produced which will force gasoline to flow through conduit 18 to the source of the low pressure, namely, the throat of venturi 12. Gasoline passing from the metering device through the valve 14 will therefore enter the conduit 16 and be drawn into the throat of the venturi 12. Upon entering the throat of the venturi 12, the gasoline will be impacted by an extremely rapid movement of air, and therefore will be finely dispersed. Furthermore, this finely dispersed gasoline is carried from the end of the venturi 12 and into the cylinder 22 or 23 before it has any opportunity to precipitate from the air. Therefore, substantially every atom of the gasoline is carried into the cylinder, and the walls of the conduit 34 will be found to be completely dry at all stages of operation of the engine, whether hot or cold. Furthermore, it is unnecessary to provide any "hot spot" in order to heat the air passing through the venturi 12 to thereby vaporize the gasoline. Such power wasting practices are completely avoided in my improved fuel distribution system. The air is drawn through the venturi 12 completely unheated. Consequently, because cold air is more dense and compact than heated air, the charge of air going into an individual cylinder will contain a greater amount of oxygen than hot air would have. This is known as an increase in volumetric efficiency. As a result, an internal combustion engine operating with my improved fuel distribution system will have greatly increased torque and power due to the increased volumetric efficiency produced by my cold air supply to the engine. Furthermore, an engine operating with my improved fuel distribution system will be found to operate at a marked decrease in temperature because of the cooling effects of the cold air entering the cylinder.

With my improved distribution system, each cylinder receives an equal amount of fuel regardless of its position. This is a distinct advantage over present type carburetor systems having one central carburetor and dependent upon air suspension. Conventional carburetor systems do not equally distribute the fuel. Some attempt has been made to correct for the improper distribution by using more than one carburetor. In fact, some attempt has been made to supply each cylinder with a complete carburetor. Even this expensive expedient has failed, because the location of the venturi of ordinary carburetors relative to the butterfly valve fails to make the venturi instantly responsive to air intake, and further, the venturi in conventional carburetors is spaced away from the cylinders, and more dependency is placed upon suspension of the fuel in air to carry the fuel into the carburetor.

Figure 4:
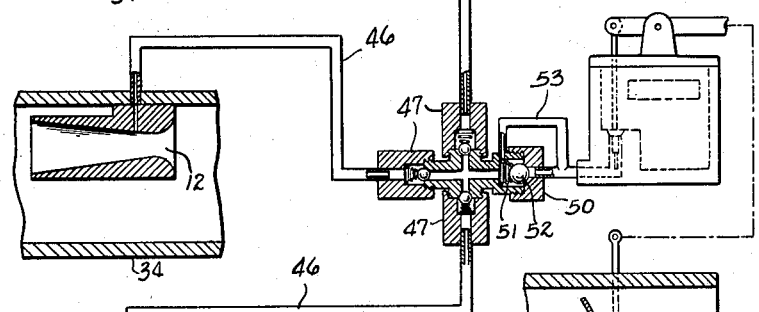
Figure 4 is a further illustration of the principle of my invention in which an alternative type valve is employed.
Figure 4:

In the Figure 4 I illustrate a ball-check valve system which I have found to be simple to construct, and which has certain advantages of operation. I have placed ball-check valves 47 in the lines 46 leading to the individual venturis. These ball-check valves 47 are for the primary purpose of stopping one venturi from drawing fuel from another, or drawing air through the other lines 46. The springs used are only of sufficient tension to overcome gravity and vibration tending to unseat the ball. The main valving action is provided by ball check valve 50 having a spring 51 holding a ball 52 seated to prevent the passage of fuel through the check valve 50. The spring 51 is of substantially greater tension than the springs in the check valve 47, and therefore will hold the ball 52 seated until the individual Venturi devices produce a pressure differential great enough to overcome the tension of the spring 51. The spring 51 is normally provided of a tension sufficient to resist the pressure differential at cranking and low running speeds.

Fuel is supplied for the engine at the low running speed, and for cranking starting, by an idle fuel line 53. The line 53 is of a small inside diameter, and can supply only sufficient fuel for a low-speed operation of the internal combustion engine. The line 53 enters the fuel distribution system posterior to the ball 52, and is therefore unaffected by the ball 52. During operation, therefore, the system illustrated in Figure 4 will supply fuel to the engine through the idle fuel line 53 during cranking and low running speed of the internal combustion engine, and will supply fuel through both the valve 52 and the idle fuel line 53 during normal running speed of the engine. Thus, an excess of fuel is prevented from pressing against the balls of the check valves 47 during low speed operation of the engine, and consequently will prevent any possibility of gasoline seeping around the balls and into the individual venturis which are at that time inoperative.

In the Figure 5 of the drawings I illustrate an alternate type of main valve and idle supply valve which may be used in place of the ball check valve 50 and idle fuel line 53 illustrated in the Figure 4. The main valving action is provided by a ball-check valve 35 for running speeds and a by-pass 38 for cranking and low speed operation. The check valve 35 contains a conventional ball 36 and a spring 37. Fuel is fed to the valve 35 through a fuel line 45 from a source at atmospheric pressure. Fuel is distributed from the valve 35 through feeder lines 46 to the various Venturi devices at the intake port. It is of course understood that the pressure differential between the lines 46 and the lines 45, during cranking and low speed operation of the engine, will be somewhat lower than during running operation of the engine. This is true because the amount of air passing through the venturi is quite small and the speed of the air travel is quite low. The spring 37 is therefore provided with sufficient tension to maintain the ball 36 seated to prevent fuel passage therethrough during the cranking and low speed operations of the engine.

During low speed operation of the engine and cranking periods for starting the engine, I provide fuel by means of the by-pass valve 38. The by-pass valve 38 is provided with a ball 39 and a spring 40 substantially as illustrated in the valve 35. However, the spring 40 is of a much weaker tension than the spring 37. Consequently, cranking and low speed operation of the engine will unseat the ball 39 and allow fuel to pass by the ball 39. The amount of fuel allowed to so pass may be conveniently controlled by any suitable means, such for example as the adjustment screw 41. A fuel line 42 extends from the top of the valve 38 into the top of the valve 35 as illustrated. A needle valve pin 43 may be positioned to move with the ball 36, and therefore when the ball 36 is unseated to allow fuel to pass thereby, the needle valve pin 43 will close the line 42 and stop the passage of fuel from the by-pass valve 38. Therefore, as the internal combustion engine is cranked to start the operation of the engine, the normal low pressure produced in the venturi will draw through the lines 46 and unseat the ball 39 in the by-pass valve 38. Sufficient fuel will be passed by the ball 39 to start operation of the engine. Further, if the engine is run only at low speeds, the degree of vacuum will be large enough to keep the ball 39 unseated and pass sufficient fuel for low-speed operation of the engine. However, as the speed of the engine increases, the degree of pressure differential will increase. When the speed of the engine reaches this degree, the ball 36 will overcome the resistance of the spring 37, and allow fuel to pass through the valve 35 to supply the engine for high-speed operation. This combination of the main valve 35 and the by-pass valve 38 serves to stop the flow of fuel when it is not required, and allow the flow of fuel at the proper times as dictated by the various Venturi devices. That is, the valve system illustrated in the Figure 5 is one of many which may be used to control the flow of fuel to the engine, but is dependent upon my improved Venturi placement for correct timing of the fuel supply. Generally, the valve mechanism as illustrated in Figure 5 in which three branch arms 46 are illustrated, will be used with a six-cylinder engine. Therefore, the flow of fuel through the valve 35 will be substantially constant because one of the six cylinders will always be drawing fuel. However, the placement of the Venturi device at the intake ports of the cylinder will direct the fuel through the particular line 46 at the correct time for distribution into the cylinder which is at that time drawing air. In other words, my Venturi placement is the timing and distribution device which makes my system practical. Fuel will be drawn through a particular branch arm 46 only when air is being drawn into a cylinder served by a particular Venturi device. Furthermore, this fuel is directed directly into the intake port, and does not have to be conducted through a long manifold tube in suspension with air. Therefore, there is no chance of fuel precipitation for the air. Furthermore, there is no overloading of raw fuel at the entrance port waiting its chance to get into a cylinder. The fuel is supplied only when the master cylinder is drawing a charge.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination with an internal combustion engine having at least an intake port, the provision of an air conduit for said port, first Venturi means in said conduit, second Venturi means having an entry opening and exit opening with a low pressure producing throat area therebetween, said exit opening extending from the interior of the second Venturi device into the interior of the conduit, said entry opening extending to atmosphere, a diaphragm device having a flexible diaphragm separating a first chamber and a second chamber, tube means extending from the throat area of said first venturi to the first chamber, tube means extending from the throat area of the second venturi to the second chamber, and fuel valve means operable by movement of said separating diaphragm, said first venturi serving to produce a differential of pressure between said first and second diaphragm chambers upon movement of air through said conduit and first venturi to said engine and thereby operate said valve means to allow fuel to be admitted to said engine, and said second venturi serving to produce a differential of pressure between said second and first diaphragm chambers upon stoppage of air movement through said conduit to said engine and thereby operate said valve means to stop fuel passage to said engine.

2. A fuel distribution and timing system for a multiple cylinder internal combustion engine having a plurality of intake ports, comprising an air intake duct having a plurality of branch arms, one such branch arm leading to each intake port, Venturi means in each branch arm adjacent said intake port, fuel metering means, means to control the volume of air flow into the engine through said air intake duct, a fuel line extending from said metering means to the throat of each Venturi means, and ball-check means disposed in the fuel line to each venturi, whereby a predetermined rate of air flow through a venturi will produce a predetermined low pressure on said fuel line to unseat said ball-check and pass a metered amount of fuel from said metering device to said venturi.

3. In combination with an internal combustion engine having a plurality of intake ports, the provision of a Venturi device adjacent each port, a fuel line to the low pressure producing throat area of each Venturi device, a ball-check valve in each fuel line, said ball-check valves having light weight seating valves capable of being actuated to unseat the valve under a pressure differential in the fuel line produced by air passing through said Venturi device in cranking the engine and at low running speed of the engine, a master ball-check valve, each said fuel line extending to the master ball-check valve, said master ball-check valve having a heavy seating spring capable of being unseated only by a pressure differential substantially greater than the pressure differential sufficient to operate the fuel line ball-check valves, and fuel by-pass means to pass fuel by the master ball-check during cranking and low speed operation of the engine.

4. A fuel distribution and timing system for an internal combustion engine having at least an intake port and an intake duct, comprising a Venturi member in said duct adjacent to said intake port, ball-check fuel valve means operable by a differential of pressure, conduit means leading from the throat of said venturi to said ball-check valve means for producing a low pressure area to operate said ball-check valve means and conduct fuel from said valve means to said intake duct, and means to meter the flow of fuel through said fuel ball-check valve means.

5. In combination with an internal combustion engine having at least an intake port, the provision of an air conduit for said port, first pressure differential means in said conduit, second pressure differential means having an entry opening and exit opening, said exit opening extending from the interior of the second pressure differential device into the interior of the conduit, said entry opening extending to atmosphere, a diaphragm device having a flexible diaphragm separating a first chamber and a second chamber, tube means extending from the throat area of said first pressure differential to the first chamber, tube means extending from the throat area of the second pressure differential to the second chamber, and fuel valve means operable by movement of said separating diaphragm, said first pressure differential serving to produce a differential of pressure between said first and second diaphragm chambers upon movement of air through said conduit and first pressure differential to said engine and thereby operate said valve means to allow fuel to be admitted to said engine, and said second pressure differential serving to produce a differential of pressure between said second and first diaphragm chambers upon stoppage of air movement through said conduit to said engine and thereby operate said valve means to stop fuel passage to said engine.

6. In combination with an internal combustion engine having at least an intake port, the provision of an air conduit for said port, air flow control means in said conduit, first Venturi means in said conduit between said port and said air flow control, second Venturi means having an entry opening and exit opening with a low pressure producing throat area therebetween, said exit opening extending from the interior of the second Venturi device into the interior of the conduit between said port and said air flow control, said entry opening extending to atmosphere, airfoil bridge means positioned on the interior of said conduit and providing a narrow air passageway past said exit opening, a diaphragm device having a flexible diaphragm separating a first chamber and a second chamber, tube means extending from the throat area of said first venturi to the first chamber, tube means extending from the throat area of the second venturi to the second chamber, and fuel valve means operable by movement of said separating diaphragm, said first venturi serving to produce a differential of pressure between said first and second diaphragm chambers upon movement of air through said conduit and first venturi to said engine and thereby operate said valve means to allow fuel to be admitted to said engine, and said second venturi serving to produce a differential of pressure between said second and first diaphragm chambers upon stoppage of air movement through said conduit to said engine and thereby operate said valve means to stop fuel passage to said engine.

7. In combination with an internal combustion engine having at least an intake port, the provision of an air conduit of definite cross-sectional area for said port, air flow control means in said conduit, Venturi means in said conduit between said port and said air flow control, said Venturi means having cross-sectional area less than said definite cross-sectional area of the air conduit thereby providing a path for part of the air through the venturi and also a path for part of the air alongside and outside of the venturi, a diaphragm device having a flexible diaphragm separating a first chamber and a second chamber, tube means extending from the throat area of said venturi to the first chamber, and fuel valve means operable by movement of said separating diaphragm, said venturi serving to produce a differential of pressure between said first and second diaphragm chambers upon movement of air through said conduit and venturi to said engine and thereby operate said valve means to allow fuel to be admitted to said engine.

8. In combination with an internal combustion engine having at least an intake port, the provision of an air conduit for said port, air flow control means in said conduit, first Venturi means in said conduit between said port and said air flow control, second Venturi means having an entry opening and exit opening with a low pressure producing throat area therebetween, said exit opening extending from the interior of the second Venturi device into the interior of the conduit between said port and said air flow control, said entry opening extending to atmosphere, a diaphragm device having a flexible diaphragm separating a first chamber and a second chamber, tube means extending from the throat area of said first venturi to the first chamber, tube means extending from the throat area of the second venturi to the second chamber, and fuel valve means operable by movement of said separating diaphragm, said first venturi serving to produce a differential of pressure between said first and second diaphragm chambers upon movement of air through said conduit and first venturi to said engine and thereby operate said valve means to allow fuel to be admitted to said engine, and said second venturi serving to produce a differential of pressure between said second and first diaphragm chambers upon stoppage of air movement through said conduit to said engine and thereby operate said valve means to stop fuel passage to said engine.

HERMAN HERSCH.

REFERENCES CITED

The following references are of record in the file of this patent:

UNITED STATES PATENTS

| Number | Name | Date |
| --- | --- | --- |
| 1,394,615 | Erwin | Oct. 25, 1921 |
| 1,937,938 | Aseltine et al. | Dec. 5, 1933 |
| 2,136,959 | Winfield | Nov. 15, 1938 |
| 2,230,311 | Seymour | Feb. 4, 1941 |
| 2,295,656 | Hersey et al. | Sept. 15, 1942 |
| 2,428,377 | Morris | Oct. 7, 1947 |
| 2,447,264 | Beardsley | Aug. 17, 1948 |